(12) United States Patent
Weppelmann

(10) Patent No.: US 11,358,233 B2
(45) Date of Patent: Jun. 14, 2022

(54) METHOD FOR GENERATING A TOOTHED WORKPIECE AND CONTROL PROGRAM, TOOLS AND TOOTH-CUTTING MACHINE SUITABLE THEREFOR

(71) Applicant: GLEASON-PFAUTER MASCHINENFABRIK GMBH, Ludwigsburg (DE)

(72) Inventor: Edgar Weppelmann, Asperg (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 13 days.

(21) Appl. No.: 16/616,111

(22) PCT Filed: Jul. 9, 2018

(86) PCT No.: PCT/EP2018/068566
§ 371 (c)(1),
(2) Date: Nov. 22, 2019

(87) PCT Pub. No.: WO2019/011871
PCT Pub. Date: Jan. 17, 2019

(65) Prior Publication Data
US 2020/0171591 A1 Jun. 4, 2020

(30) Foreign Application Priority Data
Jul. 13, 2017 (DE) .......................... 102017006651.5

(51) Int. Cl.
*B23F 5/16* (2006.01)
(52) U.S. Cl.
CPC .................................... *B23F 5/163* (2013.01)
(58) Field of Classification Search
CPC ........ B23F 21/005; B23F 5/163; B23F 5/166; B23F 15/00
See application file for complete search history.

(56) References Cited

U.S. PATENT DOCUMENTS

| 1,998,835 A | 4/1935 | Fellows |
| 2,078,124 A * | 4/1937 | Condon ................ B23F 19/101 |
| | | 409/9 |

(Continued)

FOREIGN PATENT DOCUMENTS

| DE | 202005014619 U1 | 2/2006 |
| DE | 102014008475 A1 | 12/2015 |

(Continued)

OTHER PUBLICATIONS

International Search Report and Written Opinion for PCT/EP2018/068566, ISA/EPO, dated Nov. 7, 2018, 14 pgs.

(Continued)

*Primary Examiner* — Alan Snyder
(74) *Attorney, Agent, or Firm* — Robert L. McDowell

(57) ABSTRACT

The invention relates to a method for generating a workpiece (3) having a second tooth system (2) incorporated into a first tooth system (1) having a specified tooth system geometry, wherein a first generative processing engagement, intersecting the second tooth system in the kinematics of the generating skiving, is made on the workpiece, which is in particular oversized in relation to the specified tooth system geometry, in particular on a transition from the first to the second tooth system, and then a second processing engagement, matching the specified tooth system geometry, in the kinematics of the generating skiving is carried out on the transition and a remaining oversize is in particular removed while doing so. The invention further relates to tools and to tooth-cutting machines suitable therefor.

14 Claims, 7 Drawing Sheets

(56) References Cited

U.S. PATENT DOCUMENTS

Figure 1:
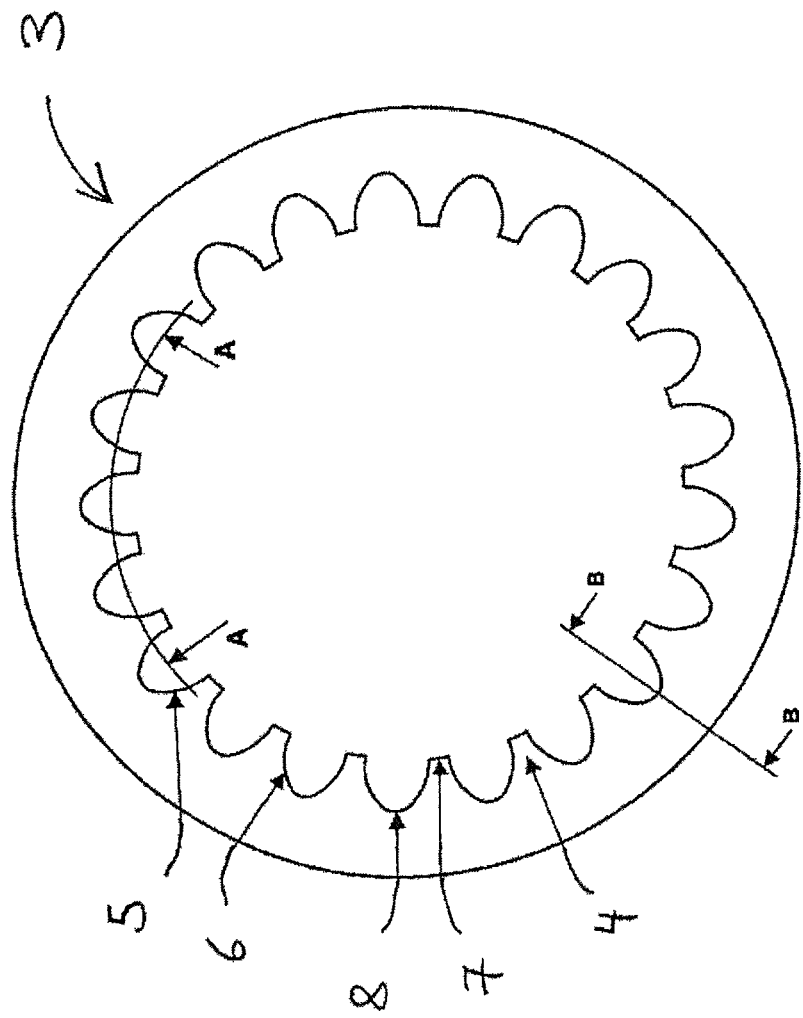

| | | | |
|---|---|---|---|
| 2,298,471 | A | 10/1942 | Drummond |
| 3,931,754 | A | 1/1976 | Nishijima et al. |
| 5,765,974 | A | 6/1998 | Faulstich |
| 9,327,358 | B2 | 5/2016 | Nakahara et al. |
| 2002/0197121 | A1 | 12/2002 | Mall |
| 2009/0311063 | A1 | 12/2009 | Carmincke et al. |
| 2015/0011142 | A1 | 1/2015 | Breith et al. |
| 2017/0072485 | A1 | 3/2017 | Weppelmann et al. |
| 2017/0113289 | A1* | 4/2017 | Sobczyk ................. B23F 5/163 |
| 2018/0111209 | A1 | 4/2018 | Prock |
| 2018/0117691 | A1 | 5/2018 | Buchholz et al. |
| 2019/0054554 | A1* | 2/2019 | Sobczyk ............... B23F 19/101 |

FOREIGN PATENT DOCUMENTS

| | | |
|---|---|---|
| DE | 102015104500 A1 | 9/2016 |
| DE | 102015120556 A1 | 9/2016 |
| EP | 2923924 A2 | 1/2015 |
| JP | 59-182021 A | 10/1984 |

OTHER PUBLICATIONS

German Patent Office Search Report for DE 102017006651.5, dated Jun. 22, 2018, 14 pgs.
Patent Abstracts of Japan, Pub. No. 59-182021, Published Oct. 16, 1984, Tokico Ltd.

* cited by examiner

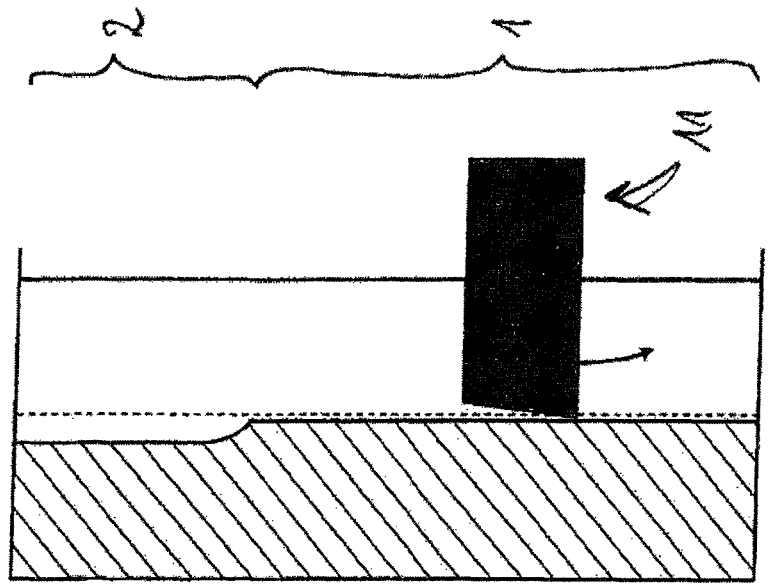
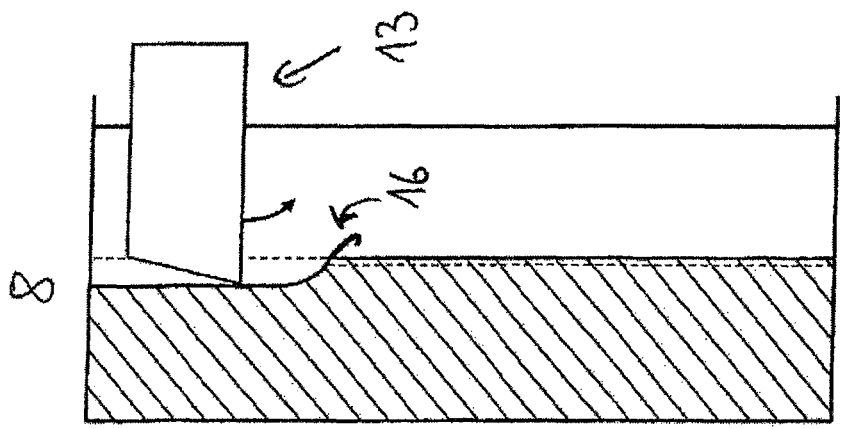
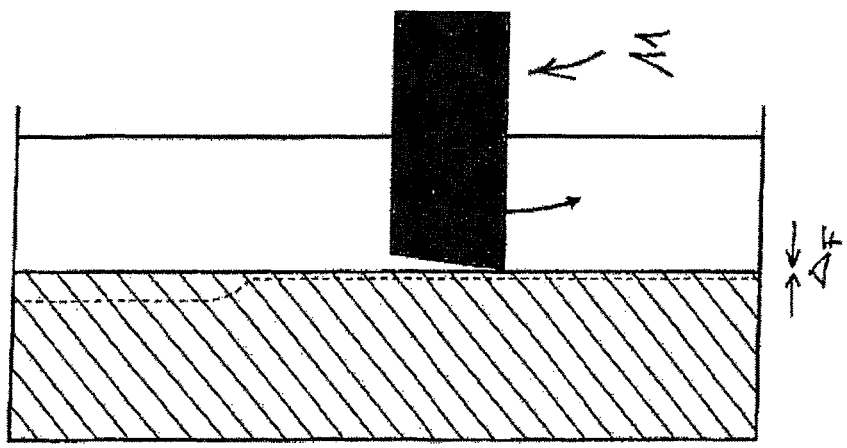
Fig. 3

METHOD FOR GENERATING A TOOTHED WORKPIECE AND CONTROL PROGRAM, TOOLS AND TOOTH-CUTTING MACHINE SUITABLE THEREFOR

The invention relates to a method for generating a workpiece having a second toothing incorporated into a first toothing having a predefined toothing geometry, and a toothing machine controlled for this purpose.

Methods of this kind are well known in the prior art. A first toothing on a workpiece can be generated by rolling by means of hobbing or skiving, for example. For a variety of applications, for example in the production of gear systems, it is also desirable for a second toothing to be incorporated into a first toothing of this kind. For example, the second toothing in a region of the first toothing that extends over an axial extension could differ from said first toothing on account of, for example, a smaller tooth thickness or conically modified flank lines. The incorporation of the second toothing is in this case usually carried out on a further processing machine, for example using tools which have cutting blades.

The problem addressed by the invention is that of improving a method of the type mentioned at the outset in terms of good achieved toothing quality, and in particular to carry said method out in a simple and time-saving manner.

This problem is solved in terms of the method by the invention in that a first machining operation that generates the second toothing in the kinematics of the skiving by means of cutting is carried out on the workpiece which in particular still has an oversize relative to the predefined toothing geometry, in particular at a transition from the first to the second toothing, and then a second machining operation which matches the predefined toothing geometry is carried out in the kinematics of the skiving at the transition and thereby in particular a remaining oversize is removed.

In this case, the invention is initially based on the knowledge that, when incorporating the second toothing into the first toothing of the workpiece during the introduction by means of skiving, there is a danger of a burr forming at the transition. If, for example, a spline toothing is introduced into a running toothing by a skiving process (power skiving), this results, in particular in the case of a small set axis intersection angle and/or small tool diameter, in burr formation at the transition on the run-out of the second toothing. This is because this can lead to an even chip flow with strongly negative effective rake angles during chip formation. There is also an increased risk of burr formation when large maximum nominal chip thicknesses are generated, the workpiece material that is to be machined increasingly tends to form burrs, or when the cutting edges of the tool used for generating the second toothing no longer cuts with the intended cutting quality, for example due to the development of wear.

In contrast to conventional means for removing burrs of this kind, consisting of coarse and/or fine burrs, in order to prevent contamination or damage to a gear system during subsequent use of the workpiece, such as those caused by brushing or using a deburring disc, for example, according to the invention a machining operation which matches the predefined toothing geometry is carried out on the transition in the kinematics of the skiving. The term "matches" means that this is a machining process of skiving, by means of which the first toothing having the predefined toothing geometry thereof can be generated. If burrs have been produced during the first machining operation, they are removed by means of this second machining operation at the transition in a manner which does not damage the first toothing, such that good toothing quality is achieved. The second machining operation, if carried out by means of chip removal, takes place at an advancement position which corresponds to the toothing depth of the predefined toothing geometry.

A suitable toothing quality can be achieved if, according to a preferred embodiment, the first machining operation is carried out when an oversize relative to the predefined toothing geometry is still present (at least) at the transition, and in the second machining operation this oversize is removed by machining. A cut is then made to the depth of the desired toothing geometry which does not correspond to the level of the edge from which the burrs protrude in an optionally uncontrolled manner. The machining quality even at the transition then corresponds to the simple skived toothing which is conventionally produced by finishing in the last machining step, for example.

A (pre)toothing of the first toothing therefore exists before the first machining operation is carried out, but said (pre)toothing does not have to fully correspond to the predetermined tooth geometry (oversize).

The invention can be applied to straight and helical toothings as the first toothing, and for internal toothings and external toothings, with the invention even offering noticeable improvements for internal toothings as a result of their limited accessibility. Furthermore, the invention is suitable for cylindrical first toothings and also for conical toothings, provided that the conicity is still such that it can be generated by a classic rolling process such as the methods mentioned in the introduction, in particular skiving.

The difference between the second toothing and the first toothing can, as explained above, be expressed in a smaller tooth thickness or in a different helix angle of its flank geometry with respect to the first toothing. However, other types of difference are also conceivable, such as a modified profile and/or an otherwise modified flank line, which constitutes the difference between the first and second toothing, or a combination of these aspects. A preferred example of the second toothing is that of a deposit introduced into the first toothing.

The second toothing could involve the machining of the tooth root region of the first toothing, but it may be sufficient, depending on the application, to modify only the tooth flanks without the root region thereof by incorporating the second toothing, for example when incorporating a deposit.

Furthermore, the second toothing can be introduced (only) from one end of the first toothing or from both ends; the cutting direction can therefore be directed away from or towards it with respect to the spindle end face. In a particularly preferred embodiment, the first machining operation ceases at the transition so as to have an axial cutting direction component directed toward the transition, and the second machining operation has an axial cutting direction component aligned with this cutting direction component. This prevents a burr from being bent only in the direction of the second toothing. The precise axial position of the second toothing in the first toothing is not crucial.

In the design in which the first toothing does not yet correspond to the predefined toothing geometry during the first machining operation, the oversize should allow removal by means of chip formation (cutting and not pressing or more cutting than pressing). The oversize is preferably at least 6 µm, preferably at least 20 µm, in particular at least 40 µm and/or at most 1.6 mm, preferably at most 1.0 mm, in particular at most 0.4 mm. In this way, machining time can be saved during production of the pre-toothing of the first toothing, since this pre-toothing does not have to have the profile shape predefined by the predefined toothing geometry, with no disadvantageous chip formation being produced in particular at the run-out of the second toothing during the incorporation thereof, which chip formation could result in too large an oversize if gaps in the first toothing were not formed to a much greater extent. In this case the oversize means the oversize per flank.

In this context, the oversize can only exist over one portion of the toothing width of the first toothing. However, in one possible embodiment, the oversize extends over the full toothing width of the first toothing and is removed in the second machining operation. This facilitates the production of the pre-toothing of the first toothing as a result of their more uniform shape.

In an alternative design, the second machining operation could only have a deburring effect in an idle stroke, by advancing at an advancement motion that is slightly less deep than one at which the toothing geometry could be generated by machining.

The first machining operation and the second machining operation could be carried out on two different tool stations, which each have a tool head, for example. However, the first and the second machining operation is preferably carried out by the same rotationally driven tool shaft. For this purpose, a tool change could be carried out on an associated tool spindle between the first and second machining (and optionally also before the first machining if the skiving wheel for the second machining operation is also used before the first machining). This variant is preferably suitable for rapidly accomplished tool changes. In a further time-saving design, however, no tool change is required, but the necessary tools are already both clamped in one clamping means.

In this context, in a preferred embodiment a tool-side operating region of the first machining operation differs from the tool-side operating region of the second machining operation. This allows the second toothing to have more variable designs with respect to the first toothing in terms of capability of being generated not only by different machine shaft controls, but also due to different tool geometries.

Nevertheless, as in a preferred embodiment, work can be performed using the same rotationally driven tool shaft and without a tool change, namely when the two operating regions are portions of a combination tool, in particular each formed by an independent tool of a tandem tool. A tool having two skiving wheels which are axially spaced apart from one another is preferably used, the skiving wheel for the first machining operation preferably having a smaller diameter than that for the second machining operation and being arranged relative thereto so as to be remote from the clamping means.

Depending on the type of second toothing, variants are conceivable in which the first machining operation is carried out in a two-flank process. However, in a particularly preferred embodiment, the first machining operation is carried out in a one-flank process. This allows increased variability, and in particular the second toothing can then be designed differently on the right-hand and left-hand flanks of the workpiece. For example, the run-out region in the first toothing could be brought to rest on the two flanks at the same or different distances from one of the two end faces, and the helix angles of the two flanks can be designed differently. Furthermore, the depth of the introduced second toothing could be differently set for the left-hand and right-hand flanks, or change in a different manner over the axial course of the flanks. The profile of the two flanks of the second toothing can also be designed differently.

Depending on the design of the first toothing, this may be also be generated in a one-flank process as a result of similar asymmetries as explained above, and in particular the second machining operation may also be carried out in a one-flank process. However, in a variant which is sufficient for various applications and saves time, the second machining operation may be carried out in a two-flank process. In particular, time can correspondingly be saved when the second machining operation is carried out, for example, as a finish-machining pass (or more) for finishing the first toothing.

In a particularly preferred embodiment, workpiece clamping of the workpiece is maintained between the first and the second machining operation, and both the first and the second machining operation therefore take place in the same clamping without this being changed in between. In this way further processing time can be saved.

In one possible embodiment, the clamped workpiece can also be moved transversely to its rotational axis between the two machining steps, for example in order to pass into a machining position having different tool-side machining positions. In this context, two workpiece spindles which can switch places could also be provided. In an alternative and preferred variant, the position and/or orientation of the workpiece rotational shaft remains unchanged between the first and the second machining operation, and therefore no machining time is lost due to additional movements that change this position or orientation between the two machining operations.

The method according to the invention is even suitable and can advantageously be used irrespective of the manner in which the workpiece is provided with at least one first toothing that is pre-machined so as to match the predefined toothing geometry. However, in a particularly preferred embodiment of the method, a toothing machining process for providing the workpiece subjected to the first machining operation is carried out in the kinematics of the skiving, and in particular using the same tool-side operating region as that of the second machining operation. In so doing, the entire toothing generation process can be carried out in an extremely time-saving manner, starting from a workpiece blank, as a result of the synergies of the pre-machining process and the second machining operation. The designs discussed above with regard to maintaining clampings and in particular maintaining orientations and positions of the workpiece shaft can also analogously apply to the relationship between the pre-toothing machining process for the first toothing and the first machining operation.

In a further preferred embodiment, deburring is also carried out on an outgoing end of the first toothing, i.e. at least on the end face of the first toothing, at which the advancement of the generation movement that is carried out in particular in the skiving ceases so as to have advancement components that are parallel to the workpiece shaft. In particular, this deburring of the outgoing end face occurs after the second machining operation. This could be achieved, for example, by means of an operating region on a rear side of one of the skiving wheels used, or by a preferably coaxially coupled deburring disc.

The workpiece may comprise a further axial transition in the region of the first toothing, for example in the form of an inner edge, in which transition the provision machining operation for generating the first toothing or a pre-toothing of the first toothing ceases, and on which burrs can therefore also be produced. To this end, a burr of this kind on the inner edge is also deburred, preferably by means of a tool-side operating region which is movement-coupled to the tool-side operating region of the first and/or second machining operation. A deburring disc which has the smallest possible axial extension is suitable for this purpose. If, for example, the inner edge is formed by a groove in the first toothing, deburring can therefore take place without damaging the toothing on the other side of the groove.

In terms of the device, the invention is therefore provided as a particularly preferred embodiment and discloses, as being worthy of protection in its own right, a tandem tool and a triple tool comprising two skiving wheels axially and coaxially spaced apart from one another and a deburring tool, also axially spaced apart, in particular in the form of a coaxially arranged deburring disc.

Furthermore, the invention provides protection for a control program for a toothing machine, which program, when executed on the toothing machine, controls the toothing machine in order to carry out a method according to any of the aforementioned method aspects.

In terms of the device, the invention provides a toothing machine comprising at least one workpiece clamping means, at least one tool clamping means and at least two linear shafts and one rotary shaft for the relative positioning of the tool clamping means relative to the workpiece clamping means, and comprising a control device for controlling the machine, which device is characterized in that it comprises a control program of this kind and/or is designed and controlled to carry out a method according to any of the aforementioned method aspects. A third linear shaft is preferably provided. All shafts are preferably CNC-controlled machine shafts.

Figure 2:
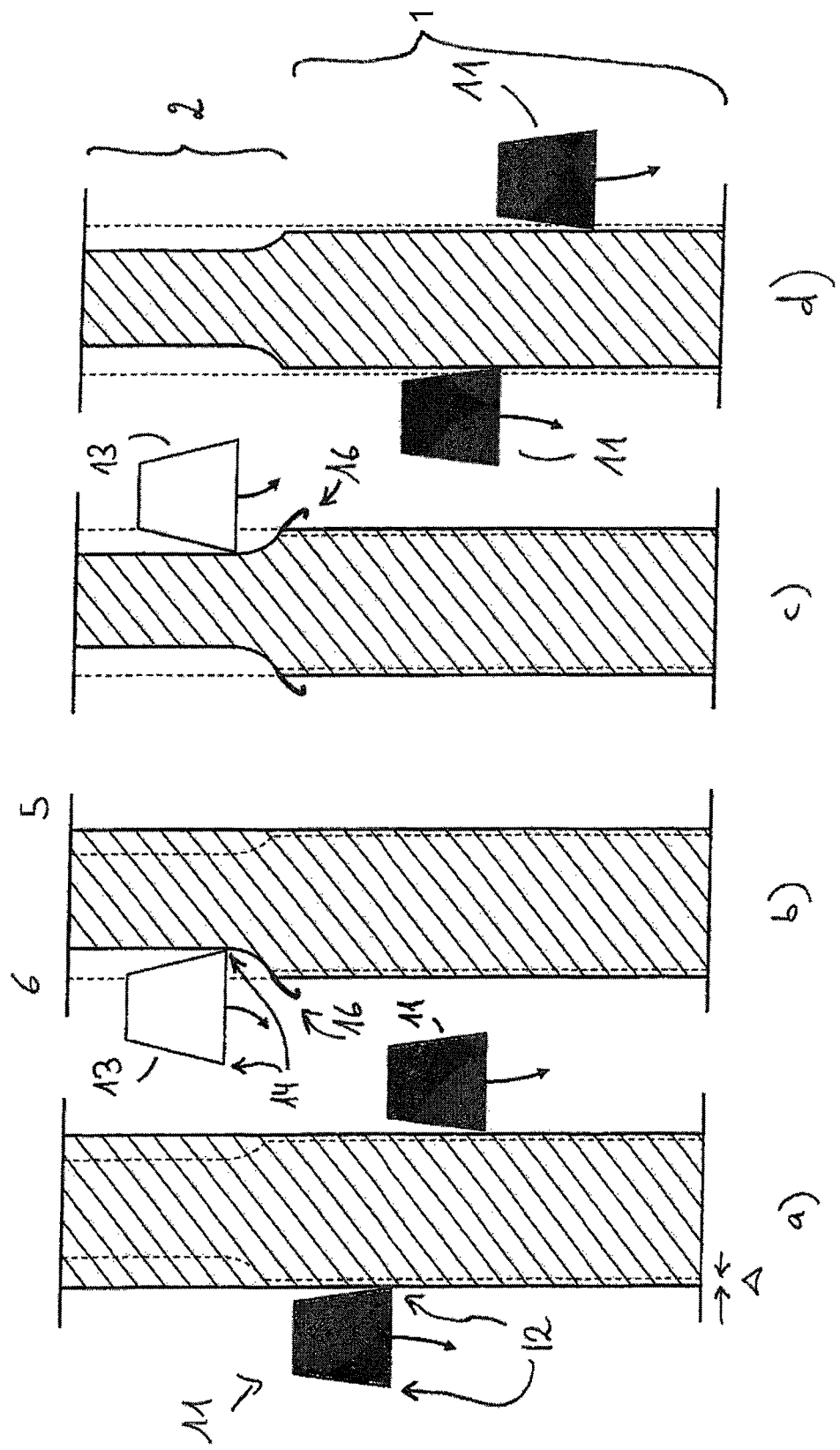
Figure 4:
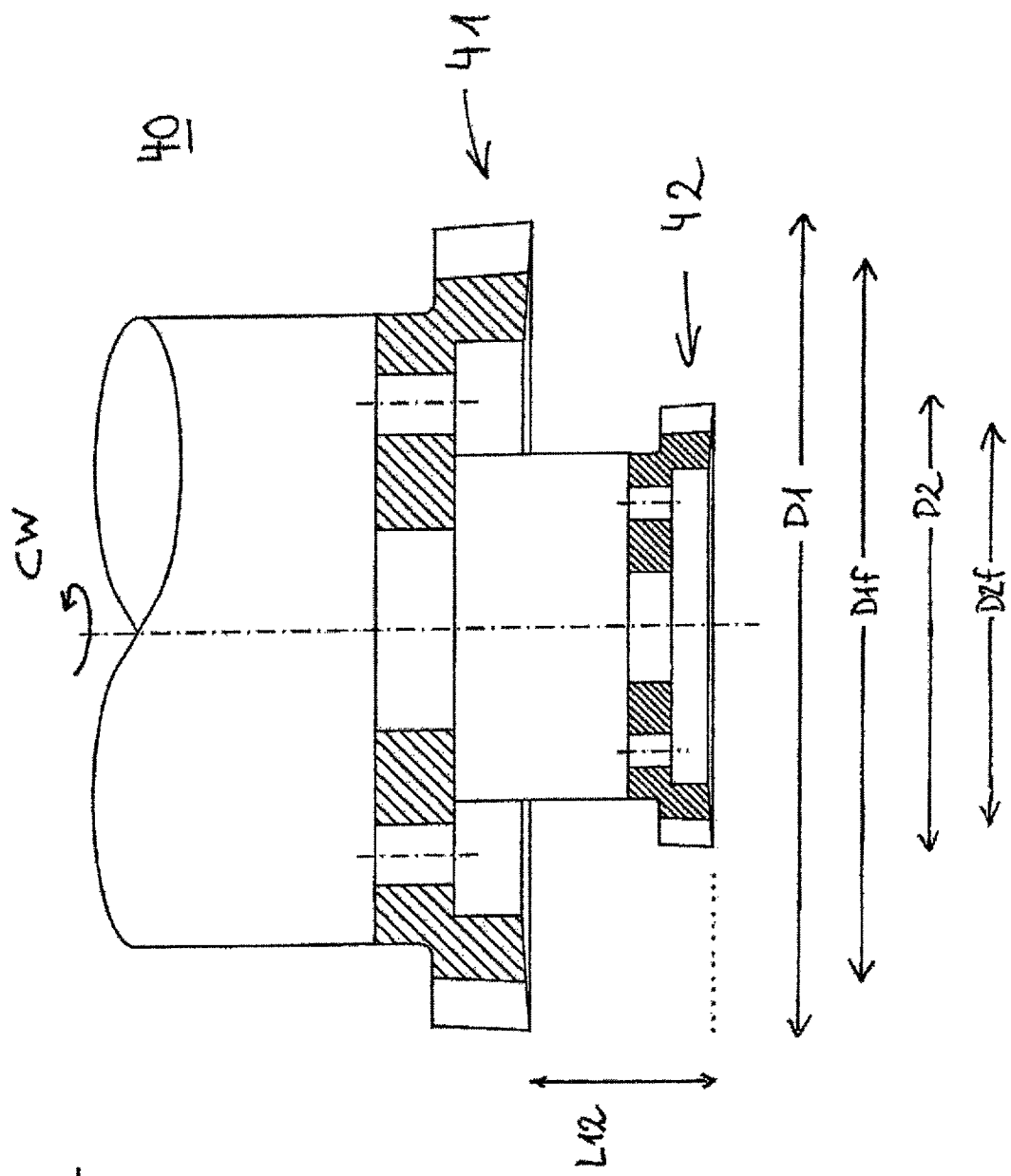
Figure 5:
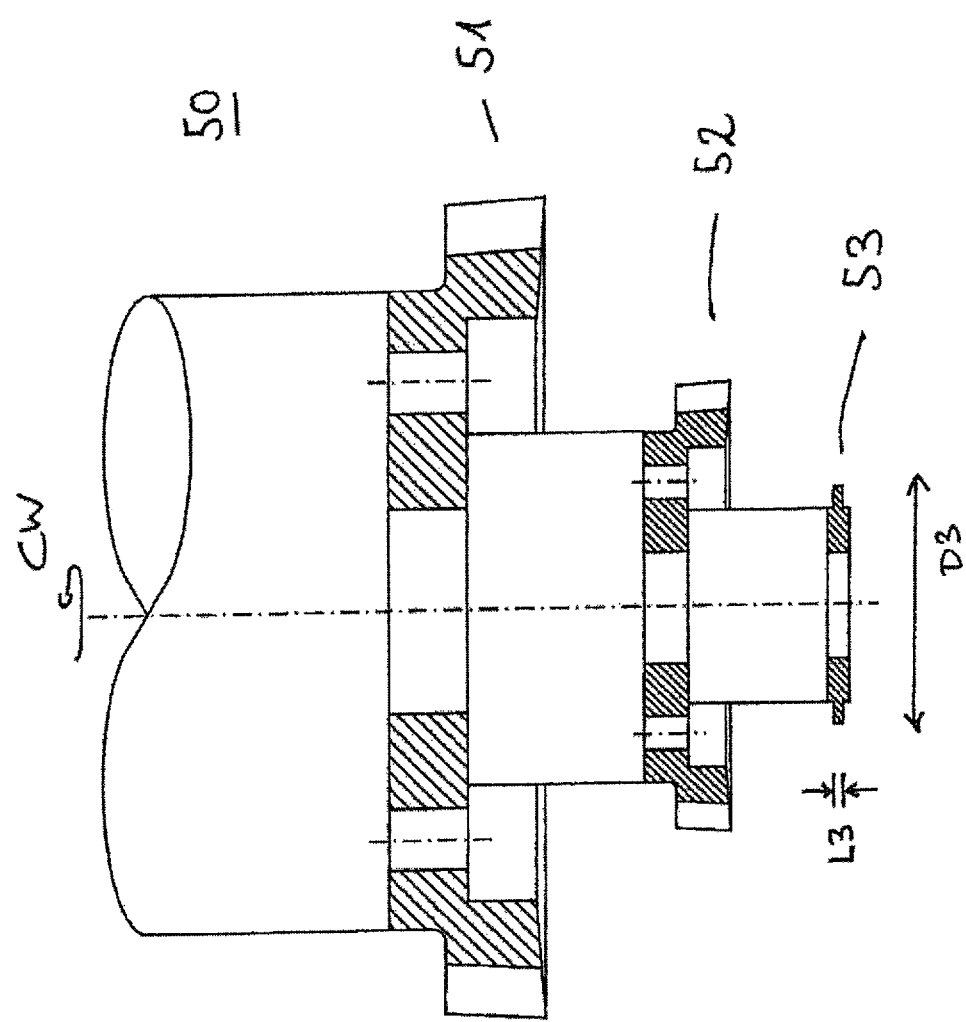
Figure 6:
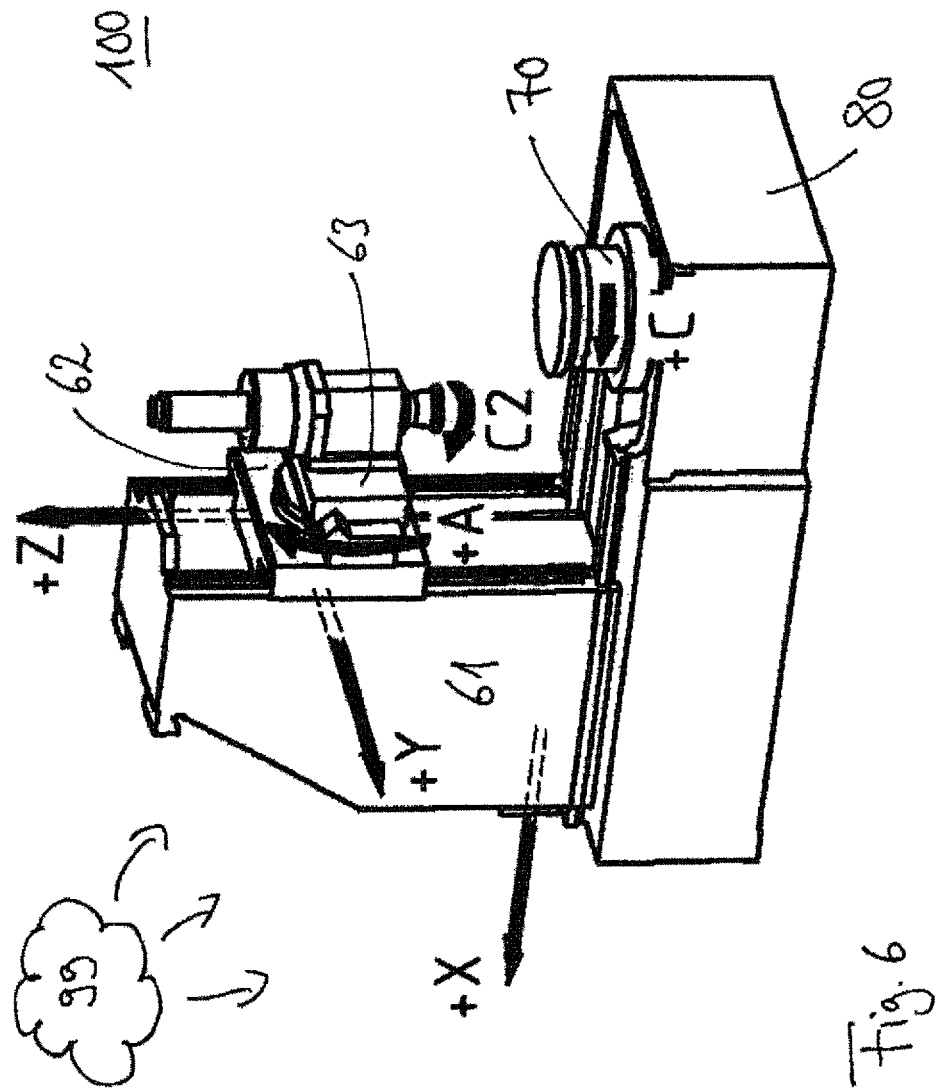
Figure 7:
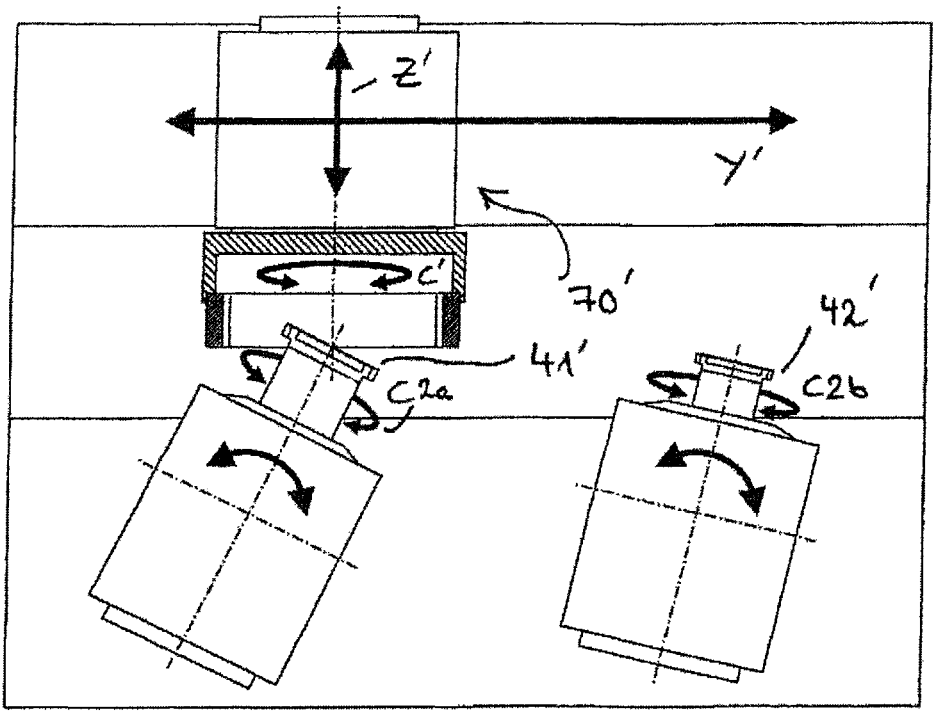
Figure 8:
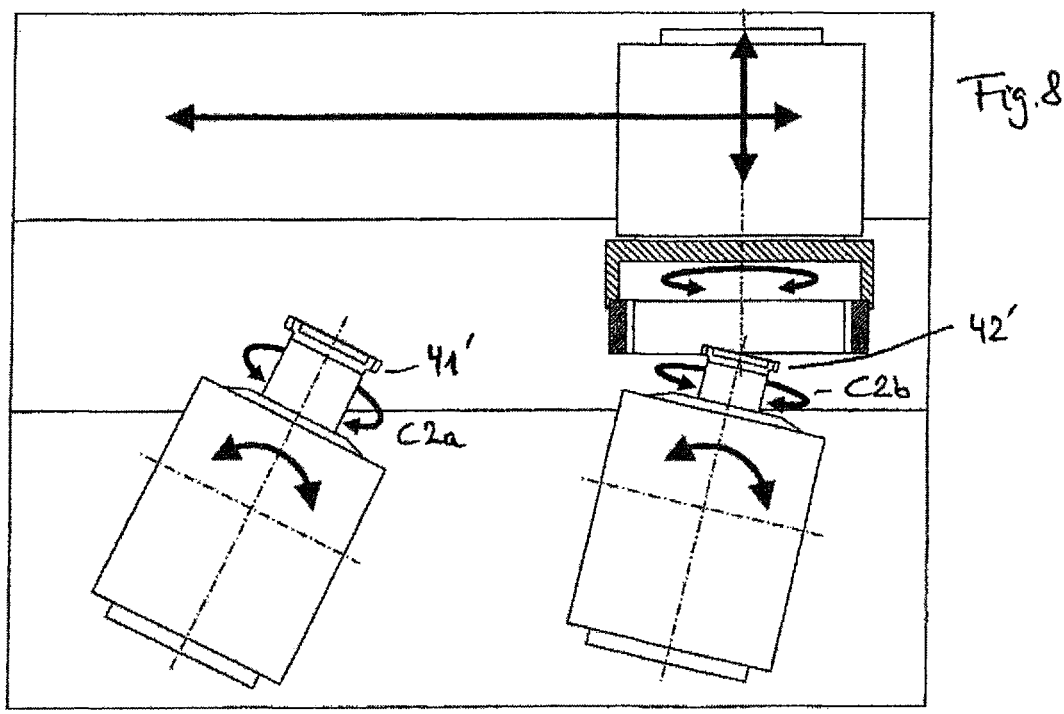

Further features, details and advantages of the invention can be found in the following description with reference to the accompanying drawings, in which FIG. 1 is a schematically simplified view of a sectional view of an internal toothing taken orthogonally to the workpiece shaft, FIG. 2 schematically illustrates tooth flank machining processes in a sectional view A-A from FIG. 1, FIG. 3 schematically illustrates a tooth root machining process using sectional views B-B from FIG. 1, FIG. 4 shows a tandem tool, FIG. 5 shows a triple tool, FIG. 6 shows a skiving machine, and FIGS. 7 and 8 illustrate a different machine concept to that in FIG. 6.

FIG. 1 schematically shows a cross section of an internal toothing 3. The left-hand flanks of the workpiece teeth 4 are denoted by 5, and the right-hand flanks are denoted by 6. Furthermore, the tooth head of the internal toothing 3 is denoted by 7 and the tooth root of the internal toothing is denoted by 8.

However, the internal toothing 3 is not uniform over its axial length, but instead has a first toothing 1 and a second toothing 2 introduced into the first toothing 1, which second toothing is not shown in FIG. 1.

An example of a toothing geometry of the internal toothing 3 on the tooth flanks can be seen in FIG. 2d, in which the first toothing 1 is shown in the axially lower region, and the second toothing 2 introduced therein is shown in the upper region. Dotted lines in FIG. 2d show the geometry of a pre-toothing, and this corresponds to the solid lines in FIG. 2a, in which in turn the toothing geometry of the first and second toothing that is to be generated is shown in dotted lines.

In one embodiment of the invention, the workpiece is generated or the second toothing is incorporated into the first toothing as follows:

First, a pre-toothing for the first toothing, which still has an oversize $\Delta$ on the left-hand and right-hand tooth flank, is generated by means of skiving, in this case in a two-flank process using a first skiving wheel 11, the cutting edges of which are denoted by 12. This is achieved, for example, in a plurality of roughing passes having axial advancement in FIG. 2a from top to bottom in the kinematics of the skiving, in which the rotational axis of the skiving wheel is at an axis intersection angle to the rotational axis of the internal toothing 3 (helical gear system principle).

In the next step, the second toothing 2 is introduced by means of a second skiving wheel 13, the cutting edges of which are denoted by 14. Whereas previously (FIG. 2a) a two-flank process was preferably used, this introduction is preferably carried out in a one-flank process, first on the one flank (FIG. 2b) and then on the other flank (FIG. 2c). This creates a burr 16 at the run-out of the second toothing. This burr-generating operation in FIGS. 2b and 2c corresponds to the first machining operation. The skiving wheel 13 for the first machining operation is in this case designed differently to the skiving wheel 11 which generates the pre-toothing of the toothing geometry of the first toothing. However, at least in this embodiment, part of a multiple tool, such as a tandem or triple tool, is coaxial to the skiving wheel 11.

The skiving wheel 13 and the axis intersection angle set in the first machining operation are selected so as to match the type of second toothing. Unlike that shown in FIG. 2, this could also be conical and in particular represent a deposit introduced into the first toothing.

In a further machining step, the (remaining) oversize $\Delta$ is removed from the first toothing by means of a skiving wheel which is designed for the machine shaft controls used for generating the first toothing having the predefined toothing geometry. In this embodiment, this skiving wheel is the same skiving wheel 11 which was also used in the step shown in FIG. 2a for generating the pre-toothing which matches the tooth geometry except for the oversize $\Delta$.

Naturally, no machining process is carried out in the region of the second toothing 2, since no material is present in this region in the corresponding advancement position. However, as a result of the machining in the transition from the second toothing to the first toothing, the burr 16 is also eliminated by the removal of the oversize $\Delta$. In this example this second machining operation is again carried out in a two-flank process.

This machining method is time-optimized to the extent that no finishing passes in the production of the pre-toothing have to be carried out before the second machining operation; one or more final removing passes in the finishing can be carried out in the second machining operation in an additionally axially shorter region in which burr removal occurs simultaneously. Overall, this results in correspondingly short machining times for the operations themselves.

If, as in one preferred embodiment, the toothing pre-machining process (FIG. 2a), the first machining operation (FIG. 2b, c) and the second machining operation (FIG. 2d) are also carried out in the same clamping of the internal toothing 3 and in particular using different operating regions of a multiple tool, this results in a comparatively very short total machining time and satisfactory toothing quality of the internal toothing 3.

FIG. 3 also shows how the root 8 of the internal toothing 3 can be machined according to a similar procedure, as shown in FIG. 2, namely when the difference between the first toothing and the second toothing also changes in the root 8 of the internal toothing. During the pre-machining for the first toothing 1, an oversize $\Delta_F$ can remain in the root region, which oversize is only removed in the region of the first toothing in the second machining operation (FIG. 3c) after the root of the second toothing 2 is machined in the first machining operation (FIG. 3b). In turn, the burr in the root region that is produced in the first machining operation is in this case eliminated in the second machining operation. However, types of introduced second toothing in which, for example, the functional surfaces of the second toothing only have to act on the flanks, and the internal toothing 3 in the root region is uniform, are also conceivable. In this case as well, an oversize $\Delta_F$ could be left in the region of the foot 8, which oversize is removed in the second machining operation.

The removals described in FIGS. 2a and 3a are carried out in this case in the context of a same (preparatory) step, and FIGS. 2d and 3c also correspond to the same machining operation. The illustration in FIG. 3b (root machining of the second toothing 2) is a simplified representation of the fact that, when the second toothing is generated in a one-flank process, the root machining could be generated from the machining processes, corresponding to FIGS. 2b and 2c, which are carried out respectively in a one-flank process and also include the root region. In principle, however, it could also be conceivable for the second toothing to be machined in a two-flank process, but the one-flank machining process allows more flexible operation with the options of separate tangential movements and/or additional rotations and, inter alia, also allows deeper cuts in the tooth root to be dispensed with. In one embodiment, the first machining operation can therefore also be limited to the tooth flanks. Conversely, in a different embodiment, the second toothing could also only extend in the root region.

In order to simplify the illustrations in FIGS. 2 and 3, the regions of the relevant cut that have not yet been machined, i.e. those below the cutting edges, are also shown as if a material removal has already taken place, although this only takes place in these regions after further advancement.

In one variant not shown in the figures, a finish-machining process of the first toothing 1 could be generated even before the introduction of the second toothing 2, without leaving an oversize $\Delta$. The burr generated in the first machining operation for the incorporation of the second toothing 2 in the first toothing 1 would then be removable by means of an idle stroke of the first skiving wheel 11 in the region of the transition between the first and second toothing (second machining operation purely deburring).

FIG. 4 shows a tandem tool 40 which has a first skiving wheel 41 and a second skiving wheel 42. The skiving wheels 41 and 42 are rigidly interconnected and have the same rotational axis CW. Using the first skiving wheel 41, the first toothing having the predefined tooth geometry can be generated, for example an impeller toothing. Using the second skiving wheel 42, the second toothing can be introduced into the first toothing. In the relevant machining process, the tool rotational axis CW is at an axis intersection angle to the workpiece rotational axis. In order to avoid collisions, for the machining of external toothings the external diameter D2 of the skiving wheel 42 is smaller than the root diameter D1$f$ of the first skiving wheel 41. For the machining of internal toothings, D2 is preferably no greater than 0.9 D1$f$. D2 is preferably no greater than 0.8 D1$f$, in particular no greater than 0.6 D1$f$. Even values of up to 0.4 D1$f$ or 0.3 D1$f$ for D2 are conceivable, even if small chip curves are formed when using correspondingly small skiving wheels. In order to avoid this, in particular D2 can be at least 40% of D1$f$, in particular at least 60% of D1$f$, even 80% or more of D1$f$, for external toothings. In a further preferred variant, the modules of the first skiving wheel 41 and of the second skiving wheel 42 are substantially the same, and preferably differ by no more than 20%, more preferably no more than 10%, in particular no more than 5%.

The axial distance L12 between the cutting edges of the second skiving wheel 42 and the first skiving wheel 41 is selected so as to be sufficiently large to prevent a risk of collision with the first skiving wheel 41 for the axis intersection angle set for the first machining operation. However, this distance L12 is preferably no greater than 2.4 D2$f$, in particular no greater than 2.0 D2$f$, and in particular no greater than 1.6 D2$f$. This reduces the risk of vibrations occurring during the first machining operation and during the introduction of the second toothing into the first toothing of the workpiece.

As already explained above, however, separate skiving wheels 41, 42 could also be used for this implementation, for example on two provided tool spindles or in the tool change on a tool spindle.

FIG. 5 shows a triple tool 50 which has a first skiving wheel 51 and a second skiving wheel 52, the arrangement of which can be the same as that of the skiving wheels 40 and 41 in FIG. 4. However, in contrast to the tandem tool in FIG. 4, a deburring disc 53 is also arranged axially from the second skiving wheel 52.

With regard to the diameter D3 of the deburring disc 53, the same relationships apply between D3 and D2$f$ as for the relationships between D2 and D1$f$ explained above with reference to FIG. 4.

The axial dimension L3 of the deburring disc 53 is in this case selected to be so small that the deburring disc 53 can be inserted into a groove provided on the workpiece, for example, and can deburr burrs from toothing edges on the groove. For this purpose, the axial distance L23 is selected to be sufficiently large, namely greater than the distance from the end of the toothing that is near the machining to the groove or to the provided working region of the deburring disc 53. Optionally, the distance L23 can also be greater than the wheel width of the machined toothing, and the end of the first toothing at which the movement ceases could then also be deburred by means of the deburring disc 53.

The terms "tandem tool" or "triple tool" mean a combination tool comprising at least the two skiving wheels or additionally the deburring disc, but additional, in particular further coaxial tools can also be part of the combination tool. However, pure tandem or pure triple tools having just the second or third tools are also conceivable.

The tandem tool from FIG. 4 or the triple tool from FIG. 5 could be clamped, for example, in the tool clamping means of a skiving machine 100 shown in FIG. 6. The skiving machine 100 is controlled via a control system, shown schematically by 99, in order to carry out a method according to any of the method aspects explained above. For this purpose, the skiving machine 100 has, on the workpiece side, a workpiece spindle 70 arranged on a machine bed 80, which spindle is in this case designed as a vertical spindle. On the tool side, a radial carriage 61 which can be moved in the radial advancement direction X relative to the machine bed 80 is provided, on which carriage an axial carriage 62 movably mounted relative thereto in the axial direction Z pivotably supports a tangential carriage 63, on which the tool head having the tool spindle shaft C2 is arranged. The pivot shaft A is in this case parallel to the radial shaft X and allows the tool spindle shaft C2 and thus the tool rotational shaft CW to pivot in the Y-Z plane, in order to set the axis intersection angle $\Sigma$ between the tool rotational axis and workpiece rotational axis of a workpiece clamped on the workpiece spindle 70, which workpiece can be an internally or externally toothed workpiece (or even a workpiece having both internal and external toothing).

The machine shown in FIG. 6 is a CNC-controlled machine comprising individual drives for the movement axes shown. However, simpler machine variants on which the methods can be executed are also conceivable; for example, the tangential carriage 63 could be dispensed with and the tool head could be arranged so as to be able to pivot relative to the axial carriage 62 without tangential displaceability. The pivot shaft A would also not have to be a motor-adjusted machine shaft, provided that different axis intersection angles can be determined.

In a further example of a different design of a toothing machine, for example, the concept of a pick-up machine comprising a suspended workpiece spindle 70' can be used, which spindle is mounted, for example, so as to be axially displaceable (Z') and can be displaced in a tangential direction between a first machining position shown in FIG. 7 for generating the first toothing or the second machining operation and a second machining position (FIG. 8) for introducing the second toothing. In this variant, a first tool spindle having a tool spindle shaft C2a supports a skiving wheel 41' for generating the first toothing (pre-toothing and second machining operation), and a second tool spindle having a rotational shaft C2b supports a second skiving wheel 42' for the incorporation of the second toothing (first machining operation).

The invention is not limited to the variants described in the above examples, but instead the features of the above description and the following claims may be essential, individually and in combination, for implementing the invention in its different embodiments.

The invention claimed is:

1. Method for generating a workpiece (3) having a second toothing (2) incorporated into a first toothing (1) having a predefined toothing geometry,
   wherein a first machining operation that generates the second toothing in the kinematics of skiving by means of cutting is carried out on the workpiece which still has an oversize ($\Delta$) relative to the predefined toothing geometry at a transition from the first to the second toothing, and then a second machining operation which matches the predefined toothing geometry is carried out in the kinematics of skiving at the transition and thereby remaining oversize is removed.

2. Method according to claim 1, wherein the first machining operation ceases at the transition so as to have an axial cutting direction component directed toward the transition and the second machining operation has an axial cutting direction component aligned to said cutting direction component.

3. Method according to claim 1 wherein the oversize is at least 6 µm and/or at most 1.6 mm.

4. Method according to claim 1 wherein the oversize present before the first machining operation is carried out extends over the full toothing width of the first toothing (1) and is removed in the second machining operation.

5. Method according to claim 1 wherein the first and the second machining operation is carried out by the same rotationally driven tool shaft (C2, CW).

6. Method according to claim 1 wherein a tool-side operating region of the first machining operation differs from the tool-side operating region of the second machining operation.

7. Method according to claim 1 wherein the first machining operation is carried out in a one-flank process.

8. Method according to claim 1 wherein the second machining operation is carried out in a two-flank process.

9. Method according to claim 1 wherein workpiece clamping of the workpiece is maintained between the first and the second machining operation.

10. Method according to claim 1 wherein the position and/or orientation of the workpiece rotational shaft (C, C') remains unchanged between the first and the second machining operation.

11. Method according to claim 1 wherein a toothing machining process for providing the workpiece subjected to the first machining operation is carried out in the kinematics of the skiving using the same tool-side operating region as that of the second machining operation.

12. Method according to claim 11 wherein the workpiece, in the region of the first toothing, has an inner edge with the inner edge having a burr thereon, wherein the inner edge is deburred by means of an operating region which is movement-coupled to the tool-side operating region of the first and/or second machining operation.

13. Method according to claim 1 wherein deburring is carried out on an outgoing end of the first toothing after the second machining operation.

14. Control program for a toothing machine, which program, when executed on the toothing machine, controls the toothing machine in order to carry out a method according to claim 1.

* * * * *